(12) United States Patent
Sakaguchi

(10) Patent No.: US 8,334,241 B2
(45) Date of Patent: Dec. 18, 2012

(54) GREASE-SEALED ROLLING BEARING WITH ROTARY OUTER RACE

(75) Inventor: Kenta Sakaguchi, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/936,562

(22) PCT Filed: Mar. 16, 2009

(86) PCT No.: PCT/JP2009/055030
§ 371 (c)(1),
(2), (4) Date: Oct. 6, 2010

(87) PCT Pub. No.: WO2009/125653
PCT Pub. Date: Oct. 15, 2009

(65) Prior Publication Data
US 2011/0033145 A1 Feb. 10, 2011

(30) Foreign Application Priority Data

Apr. 8, 2008 (JP) ................. 2008-100455

(51) Int. Cl.
*C10M 101/00* (2006.01)
*C10M 133/20* (2006.01)
(52) U.S. Cl. ....................... 508/100; 508/552
(58) Field of Classification Search .................. 508/552, 508/100
See application file for complete search history.

(56) References Cited

U.S. PATENT DOCUMENTS

| 5,301,923 A | 4/1994 | Asao et al. |
| 2002/0051595 A1 | 5/2002 | Goto et al. |
| 2005/0261141 A1 | 11/2005 | Iso et al. |
| 2007/0161520 A1 | 7/2007 | Kawamura |

FOREIGN PATENT DOCUMENTS

EP   1 770 309   4/2007
(Continued)

OTHER PUBLICATIONS

Machine Translation of JP 2005112955 by Toda et al., Apr. 2005.*

(Continued)

*Primary Examiner* — Prem C Singh
*Assistant Examiner* — Taiwo Oladapo
(74) *Attorney, Agent, or Firm* — Wenderoth, Lind & Ponack, L.L.P.

(57) ABSTRACT

A grease-sealed rolling bearing with a rotary outer race is provided of which the lubricating grease has a long life, and which produces less cold-time noise and can effectively prevent leakage of grease.
In an outer-race-rotating type of rolling bearing A for use e.g. as a pulley bearing, lubricating grease G is sealed which contains a base oil having a dynamic viscosity at 40° C. of 13 to 73 cSt and which is thickened with a thickening agent of urea family so that the grease is present in an amount of not less than 20% of the entire spatial volume of the interior of the rolling bearing, and not more than 80% of the stationary spatial volume of the interior of the rolling bearing.

7 Claims, 2 Drawing Sheets

FOREIGN PATENT DOCUMENTS

| | | |
|---|---|---|
| EP | 1 806 391 | 7/2007 |
| EP | 1 837 391 | 9/2007 |
| JP | 2001-123190 | 5/2001 |
| JP | 2004-210971 | 7/2004 |
| JP | 2005-048044 | 2/2005 |
| JP | 2005-060482 | 3/2005 |
| JP | 2005-105080 | 4/2005 |
| JP | 2005-112955 | 4/2005 |
| JP | 2005112955 A * | 4/2005 |
| JP | 2005-298629 | 10/2005 |
| JP | 2006-214516 | 8/2006 |

OTHER PUBLICATIONS

International Search Report issued Jun. 16, 2009 in International (PCT) Application No. PCT/JP2009/055030 (in English).
European Office Action issued May 10, 2012 in corresponding European Application No. 09 729 492.0.
U.S. Office Action mailed Sep. 18, 2012 in copending U.S. Appl. No. 12/746,938.

* cited by examiner

Amount of grease sealed and life

Amount of grease sealed and leakage

US 8,334,241 B2

GREASE-SEALED ROLLING BEARING WITH ROTARY OUTER RACE

RELATED APPLICATION

This application is a national stage entry of PCT/JP2009/055030 filed on Mar. 16, 2009which claims priority from continuation of Japanese Patent Application No. 2008-100455, filed Apr. 8, 2008, which is incorporated by reference in its entirety.

TECHNICAL FIELD

This invention relates to a grease-sealed rolling bearing of which the outer race is configured to rotate and which is used for a pulley in e.g. a belt system of an automotive engine.

BACKGROUND ART

It is known that in a rolling bearing of which the outer race is rotated, since the flow of lubricating grease sealed in therein is restricted under centrifugal force, oil film is more difficult to form on required parts of the bearing compared to a rolling bearing of which the inner race is rotated.

The reason is explained with reference to FIG. 1. A rolling bearing comprises concentrically arranged inner and outer races 2 and 1, a plurality of rolling elements 3 disposed between the inner and outer races 2 and 1, a retaining 4 retaining the rolling elements in position, and seal members 5 closing openings at the respective axial ends. Grease G is sealed in the interior of the bearing closed by the seal members 5.

The portion of the grease G adhered to the surface of the stationary inner race 2 scarcely flows and thus scarcely serves to lubricate the bearing. The portion of the grease G adhered to the inner surface of the outer race 1 gets stuck to the outer race 1 under centrifugal force generated due to the rotation of the outer race 1 and is thus supplied to the inner portion of the bearing only at a low rate, except when it is moved by the retainer 4.

Thus, with this type of rolling bearing, once only a small amount of grease leaks out, lubricating oil is scarcely supplied to frictional surfaces of the rolling bearing, thus causing noise and destabilize torque due to poor lubrication.

In order to solve this problem, a grease-sealed rolling bearing of which the outer race is rotated is proposed in Patent document 1. With this bearing, lubricating grease having a dynamic viscosity at 40° C. of 30 to 70 cSt is sealed in the rolling bearing such that its content is 5 to 20% relative to the entire volume of the interior of the bearing.

But the rolling bearing disclosed in Patent document 1 is used to support a fan motor in a hard disk drive or an air-conditioner and is not intended for use in an outdoor cold environment. Also, this rolling bearing is not improved with respect to cold-time noise and its service life at high temperature.

Belt systems for automotive engines include timing belts for driving camshafts and engine accessory belts for driving engine accessories and other electric devices. Pulley units are used with these belt systems.

Such pulley units include tension pulleys for applying tension to belts, and idler pulleys for suitably guiding belts. According to their shapes, there are pulleys with a front groove for guiding the groove side of a belt, and pulleys with a flat back for guiding the flat side of a belt. Pulley units are rotatably supported by a grease-sealed rolling bearing including a rotary outer race. The lubricated grease sealed in the bearing contains base oil comprising ester oil or ether oil (Patent document 2).

Patent document 1: JP2001-123190A
Patent document 2: JP2005-060482A

SUMMARY OF THE INVENTION

Object of the Invention

None of the above-mentioned conventional grease-sealed rolling bearings is free of all of the problems regarding grease life, cold-time noise and leakage of grease. It is not easy to obtain a lubricating grease having all of the above-mentioned properties by combining the conventional teachings.

Also, it is not practical to use the technical information, such as the dynamic viscosity of the base oil, of the grease sealed in a rolling bearing for a hard disk drive, which used under low load, or a rolling bearing supporting e.g. a fan motor shaft of an air-conditioner, which is rotated at a relatively low rotational speed, i.e. about 7000 rpm, in an outer-race-rotating type of rolling bearing used e.g. in a belt system of an automotive engine.

An object of the present invention is to provide a grease-sealed rolling bearing with a rotary outer race which is free of the above-mentioned problems, of which the lubricating grease has a long life, which produces less cold-time noise and can effectively prevent leakage of grease, and which is especially suitable for use as a rolling bearing for a pulley used in belt system of an automotive engine.

Means to Achieve the Object

In order to achieve this object, the present invention provides a rolling bearing with a rotary outer race in which lubricating grease is sealed which comprises a base oil having a dynamic viscosity at 40° C. of 13-73 cSt, and a thickening agent of urea family, the lubricating grease being present in an amount of not less than 20% of the entire spatial volume of the interior of the rolling bearing, and not more than 80% of the stationary spatial volume of the interior of the rolling bearing.

As used herein, the "entire spatial volume" means the difference between the volume of the space between the inner race and the outer race and the sum of the volumes of the rolling elements and the retainer.

The "stationary spatial volume" means the volume of the space between the inner race and the outer race where neither the rolling elements nor the retainer passes while the bearing is rotating.

With this outer-race-rotating type of bearing, since the base oil of the lubricating grease has a dynamic viscosity at 40° C. of 13-73 cSt, the base oil keeps a viscosity necessary for lubrication, and still, the bearing temperature is less likely to rise due to agitating resistance of base oil that bleeds into the bearing. Thus, when this outer-race-rotating type of bearing is used in e.g. a belt system of an automotive engine, it is possible to limit the bearing temperature to 160° C. or less.

If the lubricating grease is a soft one with a dynamic viscosity at 40° C. of less than 13 cSt, it cannot sufficiently lubricate ball bearings (such as deep groove ball bearings). If the lubricating grease is a hard one with a dynamic viscosity at 40° C. exceeding 73 cSt, as will be apparent from the below-described experiment results, excessive heat is generated due to agitating resistance of the lubricating grease, so that the bearing temperature tends to exceed 140° C. while this outer-race-rotating type of bearing is rotated at a high speed of 10000 to 20000 rpm, thus quickly deteriorating the lubricating grease.

The lubricating grease is sealed in an amount of not less than 20% of the entire spatial volume of the interior of the rolling bearing, and not more than 80% of the stationary spatial volume of the interior of the rolling bearing.

Because the lubricating grease is sealed in an amount of not less than 20% of the entire spatial volume of the interior of the rolling bearing, compared to bearings of which the lubricating grease is sealed in an amount of less than 20% of the entire spatial volume, its use endurance time (life) is significantly long (350 hours or longer) when used at high speed (e.g. at 20000 rpm). If the lubricating grease is sealed in an amount of less than 20% of the entire spatial volume, the use endurance time (life) is significantly short, i.e. about 100 hours. Also, since the lubricating grease is sealed in an amount of not more than 80% of the stationary spatial volume of the interior of the rolling bearing, the grease can sufficiently lubricate the bearing, thereby ensuring a long use endurance time (life). If the lubricating grease is sealed in an amount exceeding 80% of the stationary spatial volume of the interior of the rolling bearing, lubricating grease tends to leak out of the bearing. Also, if such a large amount of grease is sealed, the bearing temperature tends to be high. Especially if the lubricating grease is sealed in an amount exceeding 85% of the stationary spatial volume, the bearing temperature tends rise significantly.

According to the present invention, in order to prevent cold-time noise when the rolling bearing is used outdoors in the winter time, such as at below freezing temperature, the base oil of the lubricating grease sealed in the outer-race-rotating type of bearing preferably contains not less than 15% by weight of ester oil.

In a preferred embodiment of the lubricating grease, the base oil is a mixture of ester oil and poly-α-olefin oil. Preferably, in order to prevent cold-time noise, and to ensure required lubricating properties and a long life of the lubricating grease, the base oil is a mixture of 15 to 95% by weight of ester oil and 5 to 85% by weight of poly-α-olefin oil.

In order that the lubricating grease sealed in the outer-race-rotating type of rolling bearing has suitable flowability and thus can form sufficient oil film, the thickening agent of urea family is preferably an aliphatic urea, an alicyclic urea or a mixture thereof.

If the thickening agent of urea family is an aromatic urea, in order to ensure sufficient flowability, the base oil is preferably a mixture of 15 to 95% by weight of ether oil and 5 to 85% by weight of poly-α-olefin oil so that the base oil has a dynamic viscosity at 40° C. of not more than 54 cSt.

Advantages of the Invention

According to the present invention, lubricating grease is sealed in a grease-sealed rolling bearing with a rotary outer race, wherein the lubricating grease contains a base oil having a predetermined dynamic viscosity, is thickened by a thickening agent of urea family, and has good flowability to a certain degree. Thus, the lubricating grease never leaks out, the bearing is less likely produce cold-time noise, and the temperature is less likely to rise during rotation of the bearing, which in turn prevents deterioration of the lubricating grease and thus prolongs its life.

If the base oil of the lubricating grease is a mixture of ester oil and poly-α-olefin oil, it is possible to more effectively prevent cold-time noise, and achieve sufficient lubricating properties.

If the thickening agent of urea family is an aliphatic urea, an alicyclic urea, or a mixture thereof, the lubricating grease has sufficient flowability when sealed in the outer-race-rotating type of rolling bearing, so that it can form sufficient oil film.

DESCRIPTION OF NUMERALS

1. Outer race
2. Inner race
3. Rolling elements
4. Retainer
5. Seal member
A. Rolling bearing
G. Lubricating grease

DETAILED DESCRIPTION OF THE INVENTION

Figure 1:
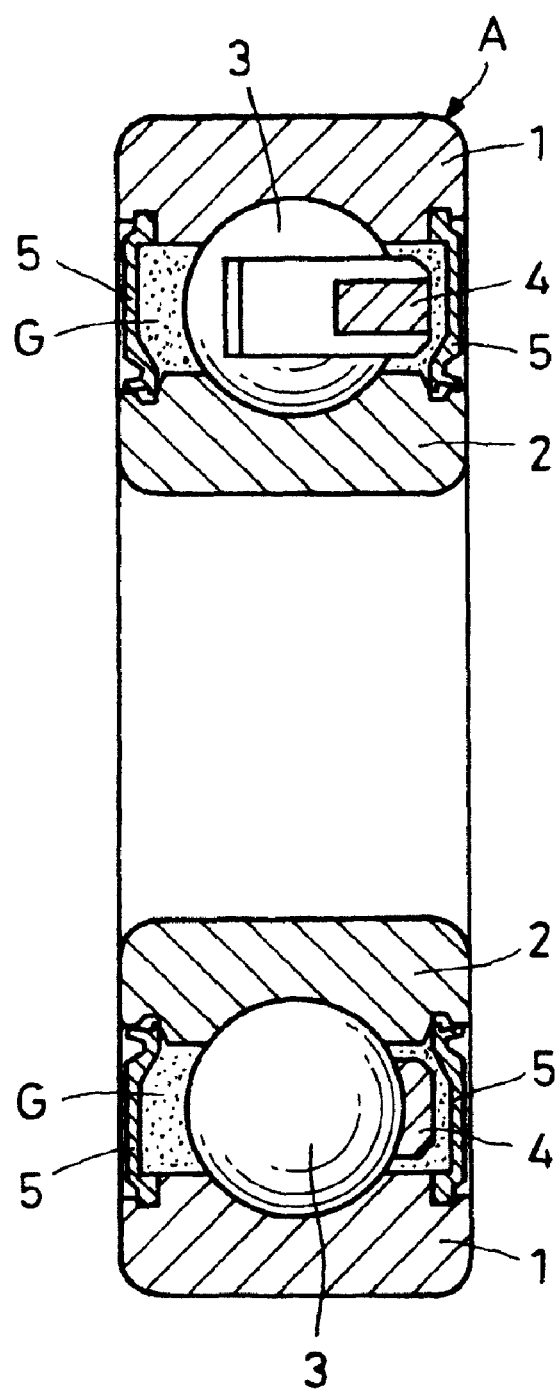
FIG. 1 is a sectional view of a grease-sealed outer-race-rotating type of rolling bearing.

The structure of the outer-race-rotating type of rolling bearing used in this invention is described with reference to the attached drawings. As shown in FIG. 1, the outer-race-rotating type of rolling bearing of the embodiment, which is a deep groove ball bearing, comprises an outer race 1, an inner race 2, a plurality of rolling elements 3 or balls disposed between the outer race 1 and the inner race 2, a retainer 4 retaining the rolling elements 3, and seal members 5 fixed to the outer race 1 and closing respective openings at the axial ends of the bearing. Lubricating grease G comprising a base oil having a dynamic viscosity at 40° C. of 13 to 73 cSt and a thickening agent of urea family is sealed in the rolling bearing in an amount of not less than 20% of the entire spatial volume of the interior of the rolling bearing, and not more than 80% of the stationary spatial volume of the interior of the rolling bearing.

The base oil used in the present invention, which has a dynamic viscosity at 40° C. of 13 to 73 cSt, has such a viscosity that it maintains required lubricating properties and is still capable of suppressing temperature rise.

For an outer-race-rotating type of rolling bearing, if the bearing temperature rises to 140° C. due to self-heating, use endurance time of 1000 hours is desired, and use endurance time of 400-900 hours is required according to specifications. Bu if the base oil has a high viscosity exceeding 73 cSt is used, the bearing temperature exceeds 140° C. due to heat buildup during lubrication, thus shortening the life of the bearing. If the base oil has a dynamic viscosity at 40° C. of less than 13 cSt, it is difficult to form oil film of a required thickness on deep groove ball bearings, which are typical outer-race-rotating type of rolling bearings.

The base oil may be a known synthetic lubricating oil or mineral oil. Preferably, the base oil is one or a mixture of mineral oils such as paraffinic and naphthenic mineral oils, synthetic hydrocarbon oils such as poly-α-olefin (PAO), ether oils such as polyphenyl ether, dialkyl ether, and dialkyl diphenyl ether oil, alkyl triphenyl ether oil and alkyl tetraphenyl ether oil, which are alkyl phenyl ethers, and ester oils such as diester oil, polyol ester oil, complex ester oil thereof, aromatic ester oil, hydrocarbon ester oil, and complex ester oil thereof.

Among them, when considering the seizure-resistant life at high temperature, i.e. heat resistance and oxidation resistance related thereto, ether oil, medium-viscosity PAO, and low-viscosity PAO are preferable in this order. As the thickening agent to be added to the grease for thickening the base oil, a thickening agent of urea family is selected. Among aliphatic diurea, alicyclic diurea and aromatic diurea, alicyclic diurea is relatively superior in stability of its crystalline structure, heat resistance, shear stability, adhesion properties and resistance to leakage. For torque, pumpabity and flowability, aliphatic diurea and alicyclic diurea are superior in this order.

the ambient temperature of −20° C. and the probability of cold-time noise being generated was calculated in percentage.

TABLE 1

|  | Example of Invention | | | | | | | | | Comparative Example |
|---|---|---|---|---|---|---|---|---|---|---|
|  | 1 | 2 | 3 | 4 | 5 | 6 | 7 | 8 | 9 | 1 |
| Base oil viscosity | Ester oil + PAO | Ester oil + PAO | Ester oil | Ester oil | Ether oil + PAO | Ester oil + PAO | Ether oil + PAO | Ester oil + PAO | Ester oil + PAO | Ether oil + PAO |
| Base oil viscosity (40° C., cSt) | 44.8 | 51.5 | 70.0 | 70.0 | 62.0 | 65.0 | 53.3 | 43.2 | 72.3 | 45.0 |
| Thickening agent | Alicyclic urea | Alicyclic urea | Aliphatic urea | Aliphatic urea + Aromatic | Alicyclic urea + Aromatic | Alicyclic urea + Aliphati | Aromatic urea | Alicyclic urea | Aromatic urea | Lithium soap |
| Penetration of lubricating grease (worked 60 times) | 275 | 264 | 288 | 265 | 220 | 280 | 286 | 283 | 300 | 280 |
| Test High temp. life test (h) | 1116 | 1148 | 1218 | 1079 | 871 | 1249 | 613 | 464 | — | 103 |
| Cold time noise generation rate (%) | 0 | 30 | 47 | 10 | — | 0 | 20 | 3 | 50 | 0 |

EXAMPLES

Examples 1-9 of the Invention and Comparative Examples 1 and 2

Lubricating grease samples each containing a base oil having a viscosity (dynamic viscosity at 40° C.) shown in Table 1 and a thickening agent shown in Table 1 were prepared so that they have penetrations shown in Table 1, and subjected to the below-described (a) high-temperature life determining test, and (b) cold-time noise generating test. The test results are shown in Table 1.

(a) High-temperature life determining test: 1.8 g of each lubricating grease sample was sealed in a deep groove ball bearing (6204LLB made by NTN Corporation; non-contact rubber seals on both sides; made of high-carbon chrome bearing steel; 20 mm in inner diameter, 47 mm in outer diameter and 14 mm wide) so that the lubricating grease is present in the amount of 40% of the entire spatial volume of the interior of the rolling bearing. The outer ring of the thus prepared rolling bearing was rotated at the speed of 16000 rpm under the axial load of 800 N and at the ambient temperature of 140° C. and the time period was measured until lubrication becomes defective.

(b) Cold-time noise generating test: 1.8 g of each lubricating grease sample was sealed in each of three deep groove ball bearings (6204LLB made by NTN Corporation; non-contact rubber seals on both sides; made of high-carbon chrome bearing steel; 20 mm in inner diameter, 47 mm in outer diameter and 14 mm wide) so that the lubricating grease is present in the amount of 40% of the entire spatial volume of the interior of the rolling bearing. Each of the thus prepared three rolling bearings for each example was started ten times at the speed of 2700 rpm under the axial load of 125 N and at As will be apparent from the results of Table 1, for the rolling bearing in which lubricating grease was sealed which is thickened with not a thickening agent of urea family but with lithium soap, its life was short, i.e. only about 100 hours, when its outer race was rotated at a high ambient temperature of 140° C.

For the rolling bearings in which lubricating grease thickened with a thickening agent of urea family was sealed, their lives were 464 hours or over, preferably 1000 hours or over. Especially when base oil of ester family was used, good results were obtained. For these examples, good results were obtained in the cold-time noise generating test, too.

Example 10 of the Invention

Base oil was prepared which is a mixture of 20% by weight of ether oil and 80% by weight of medium-viscosity poly-α-olefin and has a dynamic viscosity at 40° C. of 72.3 cSt. One mole of 4,4'-diphenylmethane diisocyanate was dissolved into half of the base oil thus prepared, while 2 moles of monoamine comprising para-toluidine was dissolved into the remaining half of the base oil. They were then mixed together and agitated, and the mixture was reacted at 100 to 120° C. for 30 minutes to deposit aromatic diurea compounds in the base oil, thus obtaining lubricating grease thickened with a thickening agent of urea family.

The lubricating grease thus obtained was sealed in a deep groove ball bearing (6206LLB made by NTN Corporation; non-contact rubber seals on both sides; made of high-carbon chrome bearing steel; 62 mm in outer diameter, 16 mm wide and 30 mm in inner diameter) so that the lubricating grease is present in the amount of 24% of the entire spatial volume.

For the rolling bearing obtained, the endurance time was measured under the conditions of a radial load of 490 N and 20000 rpm. The endurance time was 440 hours. This result is plotted in the graph of FIG. 2.

Example 11 of the Invention

A rolling bearing was prepared in exactly the same manner as in Example 10 of the Invention except that the grease was sealed in the deep groove ball bearing in the amount of 50% of the entire spatial volume.

For the rolling bearing obtained, the endurance time was measured under the same conditions as Example 10, i.e. a radial load of 490 N and 20000 rpm. The endurance time was 400 hours. This result is also plotted in the graph of FIG. 2.

Comparative Example 2

A rolling bearing was prepared in exactly the same manner as in Example 10 of the Invention except that the grease was sealed in the deep groove ball bearing in the amount of 12% of the entire spatial volume.

For the rolling bearing obtained, the endurance time was measured under the same conditions as Example 10, i.e. a radial load of 490 N and 20000 rpm. The endurance time was 100 hours. This result is also plotted in the graph of FIG. 2.

Comparative Example 3

A rolling bearing was prepared in exactly the same manner as in Example 10 of the Invention except that the grease was sealed in the deep groove ball bearing in the amount of 8% of the entire spatial volume.

For the rolling bearing obtained, the endurance time was measured under the same conditions as Example 10, i.e. a radial load of 490 N and 20000 rpm. The endurance time was 80 hours. This result is also plotted in the graph of FIG. 2.

Figure 2:
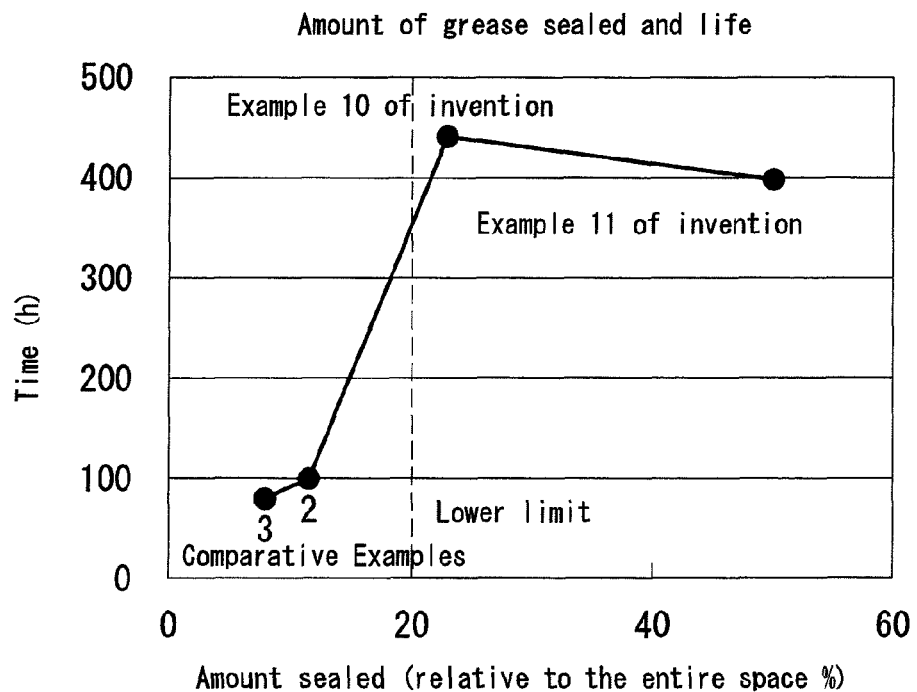
FIG. 2 is a graph showing the relationship between the amount of grease sealed in the rolling bearing and the bearing life.

As will be apparent from the results of FIG. 2, the lives of the rolling bearings in which lubricating grease was sealed in an amount of 20% or over of the entire spatial volume were 400 hours or over, which are way longer, i.e. about 350 hours longer than those of Comparative Examples 2 and 3.

Example 12 of the Invention

A rolling bearing was prepared in exactly the same manner as in Example 10 of the Invention except that the grease was sealed in a deep groove ball bearing (6204LLB made by NTN Corporation; non-contact rubber seals on both sides; made of high-carbon chrome bearing steel; 20 mm in inner diameter, 47 mm in outer diameter and 14 mm wide) so that the grease is present in the amount of 75% of the stationary spatial volume.

The rolling bearing obtained was rotated under the conditions of a radial load of 67 N and 10000 rpm. The existence of leakage was determined by checking whether or not there was a difference between the initial amount of grease sealed and its amount after the test. The result is plotted in the graph of FIG. 3.

Comparative Examples 4 to 7

Rolling bearings were prepared in exactly the same manner as in Example 10 of the Invention except that the grease was sealed in a deep groove ball bearing (6204LLB made by NTN Corporation; non-contact rubber seals on both sides; made of high-carbon chrome bearing steel; 20 mm in inner diameter, 47 mm in outer diameter and 14 mm wide) so that the grease is present in the amounts of 110, 120, 140 and 150% of the stationary spatial volume.

The rolling bearings obtained were rotated under the same conditions as in Example 12, i.e. a radial load of 67 N and 10000 rpm. The existence of leakage was determined by checking whether or not there was a difference between the initial amount of grease sealed and its amount after the test. The results are plotted in the graph of FIG. 3.

Figure 3:
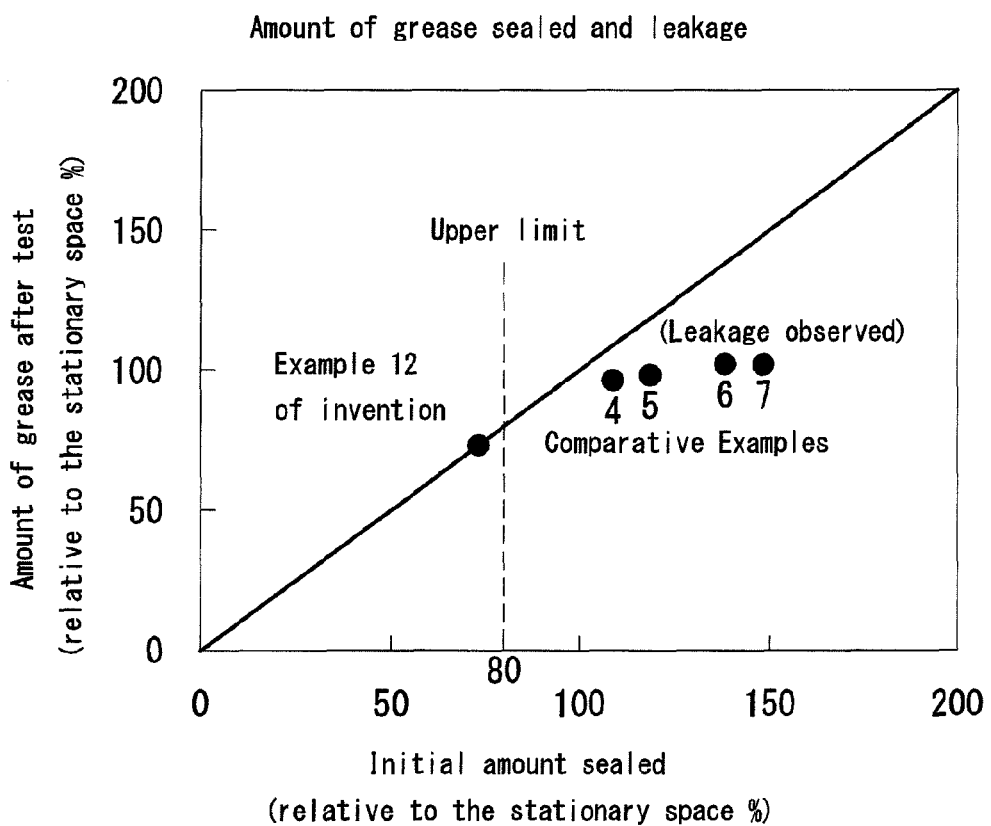
FIG. 3 is a graph showing the relationship between the amount of grease initially sealed in the rolling bearing and the amount of grease remaining in the bearing after a test.

As is apparent from the results of FIG. 3, for the rolling bearing in which lubricating grease was sealed in an amount of 80% or less of the stationary spatial volume, no leakage of grease was observed.

What is claimed is:

1. A rolling bearing comprising:
   an inner race;
   a rotary outer race;
   a plurality of rolling elements disposed between the inner race and the outer race;
   a retainer for retaining the rolling elements; and
   lubricating grease which comprises a base oil having a dynamic viscosity at 40° C. of 13-73 cSt, and a thickening agent of urea family, the lubricating grease being sealed in the bearing in an amount of not less than 20% of an entire spatial volume of an interior of the rolling bearing, and not more than 80% of a stationary spatial volume of the interior of the rolling bearing,
   wherein the entire spatial volume is an entire interior volume of the bearing minus a total volume of the rolling elements and the retainer,
   and wherein the stationary spatial volume is a portion of the entire spatial volume where neither the rolling elements nor the retainer passes while the bearing is rotating.

2. The rolling bearing of claim 1, wherein the base oil contains not less than 15% by weight of ester oil.

3. The rolling bearing of claim 1, wherein the base oil is a mixture of ester oil and poly-α-olefin oil.

4. The rolling bearing of claim 3, wherein the base oil is a mixture of 15 to 95% by weight of ester oil and 5 to 85% by weight of poly-α-olefin oil.

5. The rolling bearing of claim 1, wherein the thickening agent of urea family is an aliphatic urea, an alicyclic urea or a mixture thereof.

6. The rolling bearing of claim 1, wherein the thickening agent of urea family is an aromatic diurea, and wherein the base oil is a mixture of 15 to 95% by weight of ether oil and 5 to 85% by weight of poly-α-olefin oil.

7. The rolling bearing of claim 2, wherein the base oil is a mixture of ester oil and poly-α-olefin oil.

* * * * *